Nov. 27, 1951   G. SCHULZE   2,576,484
TRANSMISSION ARRANGEMENT
Filed Oct. 16, 1950
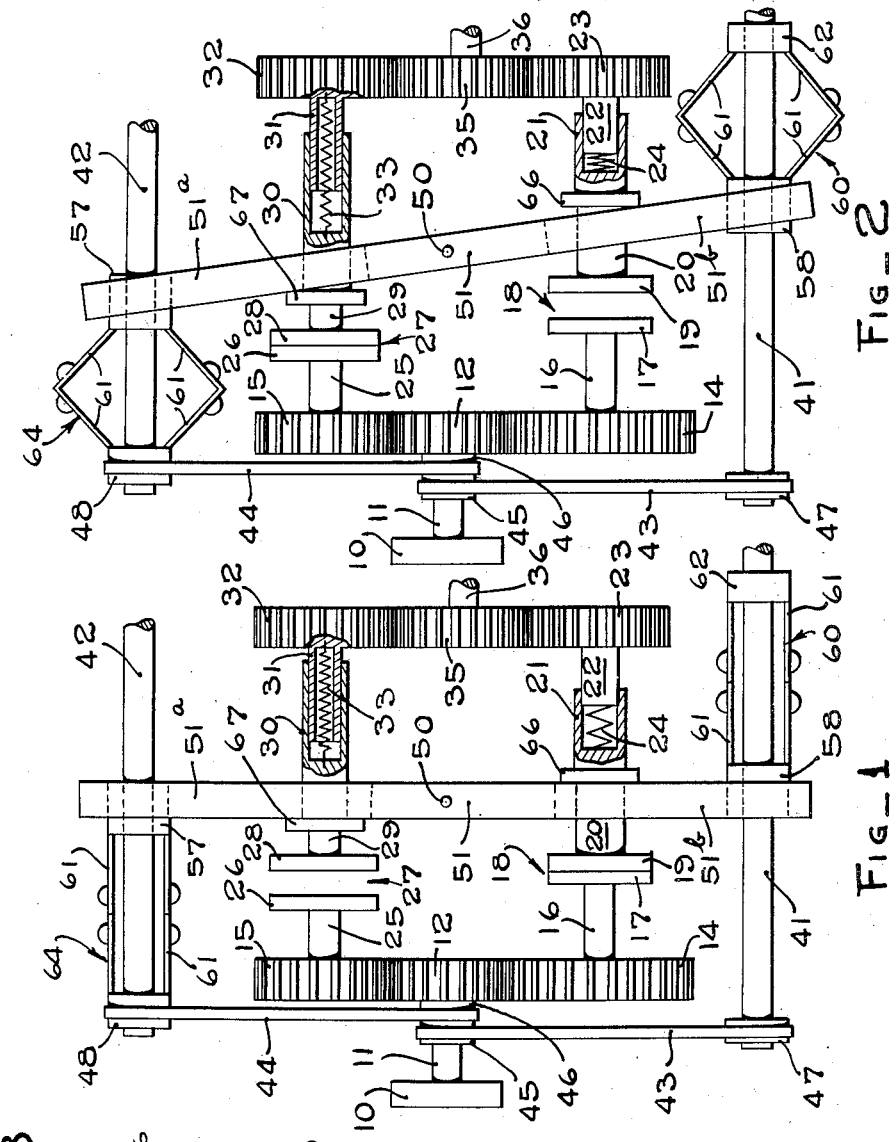
INVENTOR
GUNTHER SCHULZE
BY
PATENT AGENT Patented Nov. 27, 1951

2,576,484

UNITED STATES PATENT OFFICE 2,576,484

TRANSMISSION ARRANGEMENT

Günther Schulze, Valparaiso, Chile

Application October 16, 1950, Serial No. 190,283

7 Claims. (Cl. 74—336.5)

The invention relates to transmission arrangements of the type adapted to deliver the power of a drive or propeller shaft at a predetermined ratio to an operational shaft. More particularly the present invention relates to transmission arrangements, of the type referred to, which comprise means for varying the ratio of the power transfer from the drive shaft to the operational shaft to suit particular operating conditions, such as are presented by variations in the load encountered by the operational shaft or variations in the power developed by the drive or propeller shaft. Arrangements of this type are needed in many fields of endeavor, from motor vehicles to oil drills, tool machines and the like.

It is an object of my invention to provide a transmission arrangement that is adapted to automatically vary its transmission ratio to suit particular operating conditions.

It is another object of my invention to provide a self-adjusting power transmission arrangement of the type referred to, that combines simplicity of construction with dependabiilty in operation.

Still another object of the invention is to provide a self-adjusting transmission arrangement, comprising alternative gear trains, that operates with a minimum of wear in that it involves no shifting of the gears relative to one another to establish different power transmission ratios.

These and other objects of my invention will be apparent from the following description of the accompanying drawings which illustrate a preferred embodiment thereof and wherein, Figure 1 illustrates diagrammatically a power transmission arrangement embodying my invention;

Figure 2 illustrates the same transmission arrangement in a different operational position;

Figure 3 is a fragmentary view illustrating on an enlarged scale one of the components of the arrangement shown in Figures 1 and 2.

In Figures 1 and 2 the reference numeral 10 represents the driven side of the main clutch. Said clutch member 10 is firmly mounted upon one end of a rotatably supported drive or propeller shaft 11. Secured to the other end of said shaft 11 is a gear 12 that meshes with two gears 14 and 15, respectively, which are arranged at either side thereof. The lower one of said gears, as viewed in Figures 1 and 2, is firmly mounted upon one end of a subsidiary shaft 16 which carries on its other end the driving member 17 of a secondary clutch 18. The driven member 19 of said clutch is mounted upon an extensible shaft or spindle 20, composed of a tubular shaft portion 21 which fits slideably over and is keyed to a stub shaft 22 that carries a gear 23. Interposed between the free inner end of said stub shaft 22 and the bottom of the tubular shaft portion 21, is an expansion spring 24 which urges the tubular shaft portion to the left, as viewed in Figure 1, and thus maintains the driven member 19 of the clutch 18 yieldably in operative engagement with the driving member 17 thereof. The gear 15 on the other side of gear 12 is mounted upon a subsidiary shaft 25 which is shorter in length than the shaft 16. Said shaft 25 carries the driving member 26 of another secondary clutch 27, the driven member 28 of which is mounted upon another extensible shaft 29. Said extensible shaft 29 is composed of a tubular shaft portion 30 that telescopes over a second tubular shaft portion 31, upon the free end of which is mounted a gear 32. A contraction spring 33 tensioned between confronting inner faces of the two shaft portions 30 and 31 urges said shaft portions into deeper telescopic engagement with one another and in this manner maintains the members 26 and 28 of the clutch 27 yieldably in disengaged condition, as shown in Figure 1. The gears 23 and 32 are both constantly enmeshed with an intermediately positioned gear 35 which is mounted upon and drives the operational shaft 36.

It will be understood that when the main clutch is engaged and rotary power is applied to the propeller shaft 11 with the described components in the position illustrated in Figure 1, the power is transmitted to the working shaft 36 through gears 12 and 14, shaft 16, clutch 18, extensible shaft 20 and gears 23 and 35, with the gears 15 and 32 idling independently from one another on the shafts 25 and 29, respectively. As may be seen from Figures 1 and 2, the gear 14 is of a greater diameter than gear 15 so that a greater reduction in speed and corresponding increase in power is effected by the described arrangement when the power of the drive shaft is transmitted to the operational shaft through the gear 14, as compared with the reduction of speed effected by transmitting the power of the propeller shaft through the gear 15.

Means are provided which automatically disengage the clutch 18 against the urgency of the expansion spring 24 and at the same time engage the clutch 27 against the urgency of the contraction spring 33 as soon as the rotational speed of the propeller shaft exceeds a predetermined limit so as to transmit the power of the propeller shaft to the operational shaft through gears 12, 15, shaft 25, clutch 27, shaft 29 and gears 32, 35 as the power of the propeller shaft increases or the load encountered by the operational shaft decreases. For this purpose two auxiliary shafts 41 and 42 are rotatably supported at either side of the described arrangement in parallel relation to the shafts 16 and 25, respectively. Said auxiliary shafts are driven from the propeller shaft 11 by belts 43 and 44 trained around a pair of pulleys 45 and 46 on said propeller shaft and pulleys 47 and 48 secured to the ends of said auxiliary shafts 41 and 42, respectively. Mounted for oscillation about a centrally located pivot point 50 is a lever 51, the opposite arms of which are formed into forks 51a and 51b, as may be seen from Figure 3. The fork 51a embraces the tubular shaft 29 of the upper power train, and raised tracks 53 extending longitudinally along the inner surfaces of the prongs of said fork, engage an annular groove 56 provided in a drum or roller 57 that is keyed to the auxiliary shaft 42 so that it may slide along said shaft while forced to rotate therewith. Similarly, the fork 51b of the lever 51 embraces the tubular shaft 20 of the lower power train, and raised tracks provided along the inner surfaces of the prongs of said fork 51b engage an annular groove formed in a drum or roller 58 that is keyed to the auxiliary shaft 41. As may be seen from Figure 1, a centrifugal governor 60 in the form of weighted leaf springs 61 is interposed between the drum 58 and a collar 62 pinned to the auxiliary shaft 41 at the counterclockwise side of the lever arm 51b, and another centrifugal governor 64 of similar construction is interposed between the drum 57 and the pulley 48 on the counterclockwise side of the lever arm 51a. Said governors maintain the control lever 51 initially in the position illustrated in Figure 1, wherein said lever does not interfere with the setting of the described arrangement as established by the springs 24 and 33 and the power of the propeller shaft 11 is transmitted to the operational shaft through the large diameter gear 14. However, as soon as the speed of the auxiliary shafts 41 and 42, as determined by the speed of the propeller shaft 11, exceeds a predetermined value, which is established by the resiliency of the governor springs 61 and the weights with which they are loaded, said springs bend under the centrifugal force and pull the control lever 51 in counterclockwise direction, as viewed in Figure 1, into the position illustrated in Figure 2. When moved in this manner the forked arm 51b of the control lever 51 engages an annular flange 66 provided around the tubular shaft portion 21 on the counterclockwise side of said fork, and forces said shaft portion to the right against the urgency of the expansion spring 24 and in this manner disengages the driven member 19 of the secondary clutch 18 from the driving member 17 thereof. At the same time the opposite arm 51a of the lever 51 engages an annular flange 67 provided around the shaft portion 30 on the counterclockwise side of said arm 51a and forces said shaft portion to the left against the resistance of the contraction spring 33 effecting in this manner engagement of the secondary clutch 27. Thus, as soon as the propeller shaft 11 exceeds the predetermined speed limit as a result of an increase in the power developed by the motor which drives the propeller shaft and/or a decrease of the load encountered by the operational shaft, the power of the propeller shaft is transmitted to the working shaft through the smaller gear 15, effecting a decrease in the speed reduction ratio. Vice versa, as soon as the speed of the propeller shaft drops below said predetermined limit, due to an increase in the load encountered by the operational shaft and/or a decrease in the power available at the propeller shaft, the pull exercised by the centrifugal force upon the governors 60 and 64 is relaxed. This enables the springs 24 and 33 within the tubular shafts 20 and 29, respectively, to restore the control lever 51 to its original position which disengages the secondary clutch 27 and re-engages the secondary clutch 18 so that the power is again transmitted at a greater reduction in speed to the working shaft 36 through large diameter gear 14.

It will be understood that by properly dimensioning the gears 14 and 15 relative to one another and in relation to gear 12 and/or by properly dimensioning the gears 23 and 32 relative to one another and in relation to gear 35, matters may be arranged in such a manner that the transmission ratio is automatically suited to the varying operating conditions of the particular machine or vehicle in which the arrangement of my invention is employed.

The described transmission arrangement is of simple construction and dependable in operation, and since no gears are shifted into or out of engagement with one another, wear is held at an absolute minimum so that the arrangement is extremely economical in operation.

While I have explained my invention with the aid of a particular embodiment thereof, it will be understood that I do not wish to be limited to the specific constructional details shown and described, which may be departed from without departing from the scope and spirit of my invention.

I claim:

1. A transmission arrangement comprising a drive and a driven shaft, first and second gear trains interposed between said shafts, a first clutch interposed in said first gear train, an extensible spindle supporting one of the members of said first clutch, a second clutch interposed in said second gear train, a second extensible spindle supporting one of the members of said second clutch, an oscillatable lever arranged to engage with its opposite arms said first and second extensible spindles, spring means effective to yieldably hold said lever in a position wherein its arms maintain said first extensible spindle in an extended position causing engagement of its respective clutch, while holding said second extensible spindle in a contracted position maintaining its associated clutch in disengaged condition, and means operable in response to an increase of the rotational speed of one of said shafts beyond a predetermined value to reverse the condition of said spindles and of the clutches mounted thereon against the urgency of said spring means.

2. A transmission arrangement comprising a drive shaft, a driven shaft, first and second gear trains interposed between said shafts; a first clutch interposed in said first gear train and having a first drive member, a first driven member, a first extensible spindle supporting one of said first members and first spring means associated with said first spindle and arranged to urge said first spindle into an extended position effecting operative engagement of said first clutch members; a second clutch interposed in said second gear train and having second drive and driven members, a second extensible spindle supporting one of said second members and second spring means associated with said second spindle and arranged to urge said second spindle into a contracted position holding said second clutch members yieldably in disengagement; a control lever oscillatable about a pivot point intermediately of said gear trains and arranged to engage with its opposite arms said first and second extensible spindles; and means operable in response to an increase in the rotational speed of one of said shafts beyond a predetermined value to turn said lever in such a manner that it contracts said first spindle and extends said second spindle against the urgency of their respective spring means to cause disengagement of said first clutch members and engagement of said second clutch members.

3. A transmission arrangement according to claim 2 wherein said first gear train is of a smaller reduction ratio than said second gear train.

4. A transmission arrangement according to claim 2 wherein said control-lever turning means is responsive to an increase in the speed of said drive shaft.

5. A transmission arrangement according to claim 2 wherein said control-lever-turning means are centrifugal governors.

6. A transmission arrangement comprising a drive shaft, a driven shaft, first and second power trains interposed between said shafts, a first normally engaged clutch contained in said first power train, a second normally disengaged clutch contained in said second power train, a control lever having opposite arms arranged to engage said clutches, auxiliary shafts disposed at either end of said control lever, governors mounted upon said auxiliary shafts and arranged to effectively engage the opposite ends of said control lever and means driving said auxiliary shafts from one of said main shafts, said governors being arranged to turn said lever upon increase of the rotational speed of said auxiliary shafts beyond a predetermined value in a manner causing disengagement of said first clutch and engagement of said second clutch.

7. A transmission arrangement according to claim 6 wherein said governors comprise drums keyed to said auxiliary shafts and having circumferential grooves provided in their outer surfaces, and wherein the arms of said control lever are forked, with raised tracks provided along the inner surfaces of their forks, and are arranged to engage with said raised tracks the circumferential grooves of their respective drums.

GÜNTHER SCHULZE.

REFERENCES CITED

The following references are of record in the file of this patent:

UNITED STATES PATENTS

| Number | Name | Date |
|---|---|---|
| 1,950,992 | Molyneux | Mar. 13, 1934 |
| 2,088,804 | Molyneux | Aug. 3, 1937 |
| 2,381,805 | Buck | Aug. 7, 1945 |